(12) United States Patent
Zhang et al.

(10) Patent No.: US 7,095,478 B2
(45) Date of Patent: *Aug. 22, 2006

(54) LIQUID CRYSTAL DISPLAY DEVICE AND METHOD FOR FABRICATING THEREOF

(75) Inventors: Hongyong Zhang, Kanagawa (JP); Takeshi Fukunaga, Kanagawa (JP)

(73) Assignee: Semiconductor Energy Laboratory Co., Ltd., Atsugi (JP)

( * ) Notice: Subject to any disclaimer, the term of this patent is extended or adjusted under 35 U.S.C. 154(b) by 95 days.

This patent is subject to a terminal disclaimer.

(21) Appl. No.: 09/969,268

(22) Filed: Sep. 24, 2001

(65) Prior Publication Data

US 2002/0018157 A1 Feb. 14, 2002

Related U.S. Application Data

(63) Continuation of application No. 08/835,725, filed on Apr. 11, 1997, now Pat. No. 6,323,932.

(30) Foreign Application Priority Data

Apr. 12, 1996 (JP) .............................. 8-115673

(51) Int. Cl.
G02F 1/1339 (2006.01)
G02F 1/136 (2006.01)

(52) U.S. Cl. ........................................ 349/155; 349/43
(58) Field of Classification Search ................ 349/49, 349/155, 156, 157, 158, 43
See application file for complete search history.

(56) References Cited

U.S. PATENT DOCUMENTS

| | | | | |
|---|---|---|---|---|
| 4,252,414 A | * | 2/1981 | Kinugawa et al. .......... | 349/153 |
| 4,744,639 A | * | 5/1988 | Tsuboyama .................. | 349/162 |
| 4,846,560 A | * | 7/1989 | Tsuboyama et al. .......... | 349/19 |
| 5,107,355 A | * | 4/1992 | Satoh et al. .................. | 349/42 |
| 5,151,803 A | * | 9/1992 | Wakita et al. ............... | 349/133 |
| 5,151,807 A | * | 9/1992 | Katayama et al. ............. | 349/42 |
| 5,426,526 A | | 6/1995 | Yamamoto et al. | |
| 5,446,562 A | * | 8/1995 | Sato ........................... | 349/139 |
| 5,446,569 A | * | 8/1995 | Iwai et al. ................... | 349/123 |
| 5,477,359 A | | 12/1995 | Okazaki ...................... | 349/116 |
| 5,502,583 A | * | 3/1996 | Sukegawa et al. ............ | 349/42 |
| 5,510,916 A | * | 4/1996 | Takahashi ................... | 349/110 |
| 5,539,547 A | * | 7/1996 | Ishii et al. ..................... | 349/86 |
| 5,546,205 A | * | 8/1996 | Sukegawa et al. ............ | 349/46 |
| 5,585,951 A | | 12/1996 | Noda et al. | |
| 5,629,787 A | * | 5/1997 | Tsubota et al. ............. | 349/153 |
| 5,638,199 A | | 6/1997 | Tsubota et al. | |
| 5,641,974 A | | 6/1997 | den Boer et al. ........... | 349/138 |
| 5,699,139 A | * | 12/1997 | Aastuen et al. ............. | 349/156 |
| 5,708,485 A | * | 1/1998 | Sato et al. .................... | 349/44 |
| 5,721,600 A | | 2/1998 | Sumiyoshi et al. ......... | 349/121 |
| 5,777,701 A | * | 7/1998 | Zhang ......................... | 349/44 |
| 5,784,132 A | * | 7/1998 | Hashimoto ................... | 349/44 |
| 5,784,133 A | * | 7/1998 | Kim et al. ..................... | 349/44 |
| 5,843,225 A | | 12/1998 | Takayama et al. | |
| 5,895,933 A | | 4/1999 | Zhang et al. | |

FOREIGN PATENT DOCUMENTS

EP  0 507 639 A2  10/1992
EP  0 603 866 A1  6/1994

(Continued)

*Primary Examiner*—Toan Ton
(74) *Attorney, Agent, or Firm*—Fish & Richardson P.C.

(57) ABSTRACT

To provide a technology for fabricating a high image quality liquid crystal display device, a set range of a cell gap for holding a liquid crystal layer is limited in accordance with a distance of a pixel pitch in which specifically, the cell gap is set to be a distance of one tenth of the pixel pitch, whereby the high image quality liquid crystal display device with no occurrence of image display failure caused by disturbances of an electric field such as disclination, can be realized.

74 Claims, 4 Drawing Sheets

FOREIGN PATENT DOCUMENTS

| | | |
|---|---|---|
| JP | 62-278537 | 12/1987 |
| JP | 63-070230 | 3/1988 |
| JP | 63-279228 | 11/1988 |
| JP | 1-94316 | 4/1989 |
| JP | 3-111820 | 5/1991 |
| JP | 03-243924 | 10/1991 |
| JP | 04-031826 | 2/1992 |
| JP | 04-037726 | 2/1992 |
| JP | 04-323625 | 11/1992 |
| JP | 05-034720 | 2/1993 |
| JP | 05-093922 | 4/1993 |
| JP | 5323370 | 12/1993 |
| JP | 06-095153 | 4/1994 |
| JP | 6186555 | 7/1994 |
| JP | 06-194689 | 7/1994 |
| JP | 6-258662 | 9/1994 |
| JP | 07-020496 | 1/1995 |
| JP | 07-181438 | 7/1995 |
| KR | 1030372 | 4/1998 |

\* cited by examiner

LIQUID CRYSTAL DISPLAY DEVICE AND METHOD FOR FABRICATING THEREOF

This is a continuation of application Ser. No. 08/835,725, filed Apr. 11, 1997, now U.S. Pat. No. 6,323,932.

BACKGROUND OF THE INVENTION

1. Field of the Invention

The present invention disclosed in the specification relates to a liquid crystal display device having pixel areas arranged in a matrix form on a same substrate, particularly to an active matrix type liquid crystal display device having semiconductor devices using semiconductor thin films. Silicon films can representatively be used as the semiconductor thin films.

2. Description of Related Art

In recent times, technologies for making a semiconductor device using semiconductor thin films, for example, a thin film transistor (TFT) on an inexpensive glass substrate have been rapidly developed. The reason is that demand for an active matrix type liquid crystal display device has been enhanced.

According to an active matrix type liquid crystal display device, TFTs are arranged to each of pixel areas of several tens through several millions arranged in a matrix and electric charges inputted to and outputted from respective pixel electrodes are controlled by the switching function of the TFTs.

Figure 1A:
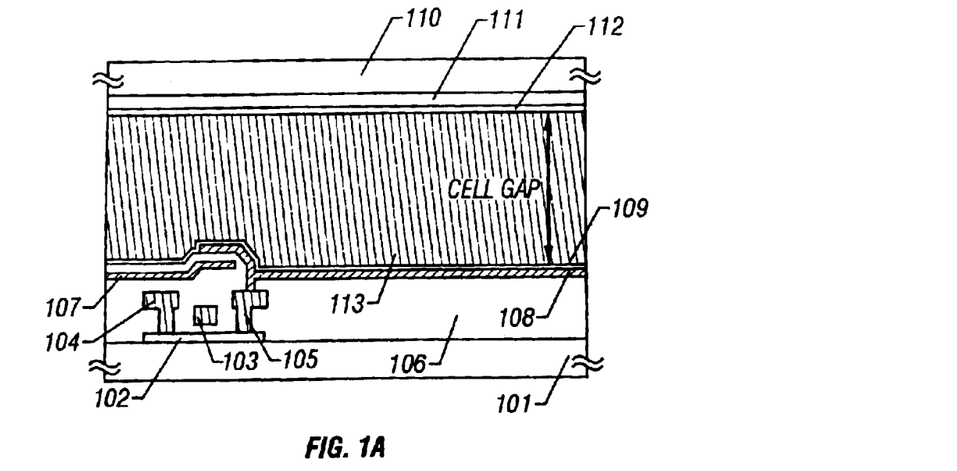
FIGS. 1(A) and 1(B) are views showing the constitution of a liquid crystal display device.

Here, an explanation will be given of the basic structure of an active matrix type liquid crystal display device arranged with thin film transistors in reference to FIGS. 1(A) and 1(B). Firstly, FIG. 1(A) is a view showing a section cutting a liquid crystal display device illustrated by FIG. 1(B) in a direction orthogonal to a substrate. The section corresponds to a section cut by a broken line designated by a line A–A' of FIG. 1(B).

Numeral 101 designates a substrate having transparency on which an insulating film (not illustrated) is formed. Numeral 102 designates an active layer of a TFT, numeral 103 designates a gate electrode, numeral 104 designates a data line, numeral 105 designates a drain electrode, numeral 106 designates an interlayer insulating film, numeral 107 designates a black matrix, numeral 108 designates a pixel electrode comprising a transparent conductive film and numeral 109 designates an alignment film.

The whole substrate having TFTs which comprise as described above is hereinafter referred to as an active matrix substrate. Although attention is paid to only one pixel area according to FIG. 1(A), the active matrix substrate is actually constituted by several tens through several millions of the pixel areas and drive circuits driving the pixel areas.

Meanwhile, numeral 110 designates a substrate having transparency, numeral 111 designates an opposed electrode constituted by a transparent conductive film and numeral 112 designates an alignment film. The whole substrate comprising as described above and opposed to the active matrix substrate is referred to as an opposed substrate.

After performing rubbing treatment for regulating the alignment of a liquid crystal material in later steps, the active matrix substrate and the opposed substrate are pasted together as to be opposed to each other by a seal member, not illustrated.

In that case spacers, not illustrated, are interposed between the both substrates with a uniform density whereby a uniform substrate interval (referred to as cell gap) is obtained. Strictly speaking, in the case of the structure illustrated by FIG. 1(A), a distance between the alignment film 109 on the side of the active matrix substrate and the alignment film 112 on the opposed substrate is the cell gap.

The seal member serves not only as an adhesive agent for pasting the both substrates together also as a seal member for sealing a liquid crystal material between the both substrates at an image display region comprising a plurality of pixel areas.

Thus, a liquid crystal material 113 is sealed in an image display region (each of the plurality of pixel areas) as illustrated by FIG. 1(A). In this way, the active matrix type liquid crystal display device having the constitution as illustrated by FIG. 1(A) is formed.

According to the pixel area illustrated by FIG. 1(A), an image signal controlled by the thin film transistors is stored at a condenser formed between the pixel electrode 108 and the opposed electrode 111 with the liquid crystal material 113 as an insulating layer.

At this moment an electric field in correspondence with a voltage level of the image signal is formed between the pixel electrode 108 and the opposed electrode 111 in the case of an analog gray scale system. Further, various gray scales of image displays can be carried out by using the property of the liquid crystal material 113 where an optical response is varied in accordance with varying of the applied voltage.

A nematic group liquid crystal material (for example, TN (Twisted Nematic) type or STN (Super Twisted Nematic) type liquid crystal material) is generally used frequently as a liquid crystal material. According to the liquid crystal display device as illustrated by FIG. 1(A), the nematic group liquid crystal material is provided with a property where the long axis direction of the liquid crystal is substantially in parallel to the substrate (however, a pretilt angle may be provided) when the electric field is applied thereto and the long axis direction is directed to an electric field direction when the electric field is formed.

Accordingly, the long axis direction is varied in accordance with presence or absence of the electric field applied on the liquid crystal material. Thus the image display is carried out by controlling the amount of transmittance of light by the amount of variation of the long axis direction.

However, such a behavior of the liquid crystal material is a phenomenon applicable only when the direction of the electric field formed between the pixel electrode 108 and the opposed electrode 111 is in vertical to the substrate.

For example, in a region where a horizontal electric field substantially in parallel to the substrate is formed, the alignment of the liquid crystal material is disturbed whereby alignment defect is caused and desired image is not provided.

Normally, when a cell gap is provided as to be suitable for the applied voltage on the pixel electrode 108, a vertical electric field (electric field orthogonal to the substrate) is dominant. However, as the cell gap is increased, the influence of the vertical electric field is weakened whereas the influence of the horizontal electric field is strengthened.

Figure 1B:
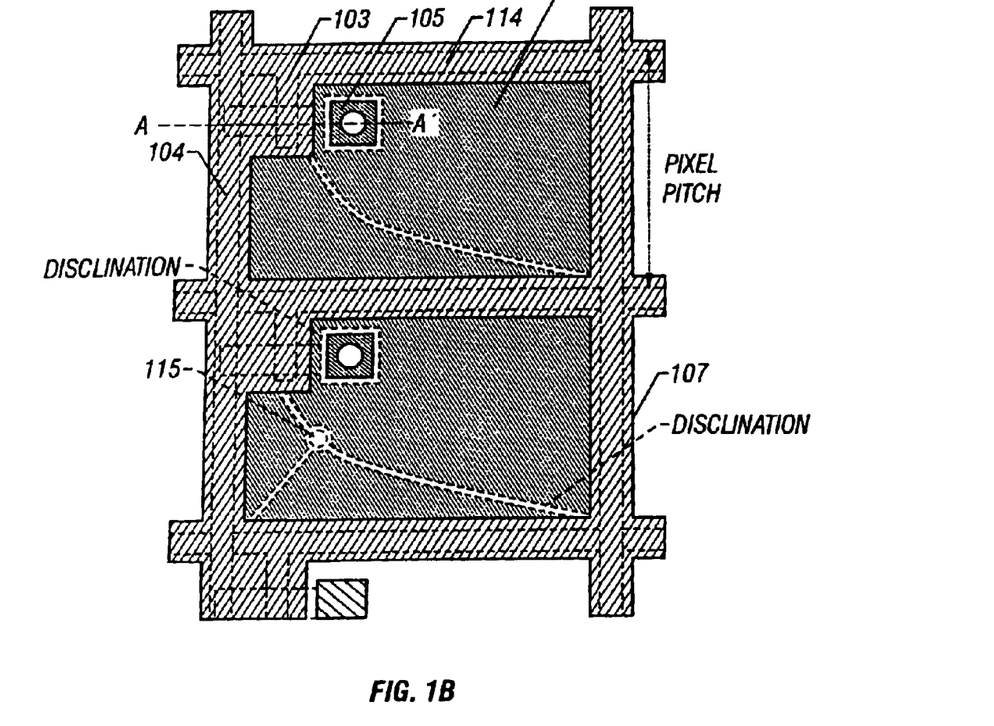

Here, FIG. 1(B) is a view showing from the top face pixel areas where alignment defects of the liquid crystal material are caused by the influence of the electric field in the horizontal direction. Incidentally, areas except for the image display area is masked by the black matrix 107. Therefore, wirings and the like disposed below the black matrix are shown by dotted lines.

In FIG.(B), white lines formed in the image display areas (areas not asked by the black matrix 107) show disturbances of image display caused by alignment defects of the liquid crystal material, which are referred to as disclinations. These areas are under a state where abnormality occurs, different from the inherent alignment state of liquid crystal molecules.

As one cause of the occurrence of the disclination, firstly, influence of the horizontal electric field occurred by cross talk among wirings or among the thin film transistors, is pointed out.

For example, many of the disclinations, as illustrated at the upper stage of the pixel area of FIG. 1(B), were observed according to experiments by the inventors. It is conceived that the horizontal electric field is formed by a potential difference between the front end of the gate electrode 103 and a portion where a gate line 114 and a data line 104 intersect with each other.

This phenomenon is more manifested as the width of the pixel area (pixel pitch) is narrowed, that is, an inter-wiring distance is narrowed in pursuit of highly fine image display. Incidentally, the pixel pitch is defined by the short side of the pixel area.

Further, narrowing of the pixel pitch signifies relative enlargement of the cell gap and it is anticipated that the influence of the horizontal electric field will more be strengthened unless the cell gap is pertinently changed in accordance with the pixel pitch.

Other than the above-described case, there were cases where a disclination as illustrated at the lower stage of FIG. 1(B) was observed due to the disturbance in the alignment of the liquid crystal material in the vicinities of spacers 115 that are arranged for securing the cell gap.

Also, as other cause stepped differences of the pixel electrode 108 are caused at the surrounding of wirings or the thin film transistors. The problem is that the disclination occurs at the surrounding of the stepped difference when the alignment treatment is incomplete in the rubbing operation caused by the presence of the stepped difference or by a horizontal electric field caused at the side face of the stepped difference.

Almost all of the disclinations caused at the surroundings of the stepped differences are masked and hidden by the black matrix. However, only a contact portion for bringing the active layer 102 and the pixel electrode 108 into contact with each other, may not be masked by the black matrix 107 and the disclination may be observed there.

The disclinations formed at the pixel areas of the liquid crystal display device give an extremely unpleasant feeling visually such as blurring the display image as a whole, or the like.

SUMMARY OF THE INVENTION

It is a problem of the invention disclosed in the present specification to realize a liquid crystal display device for providing high quality image with no occurrence of the disclination in view of the above-described drawbacks.

As explained above, the disclination is a phenomenon that is manifested with parameters of the pixel pitch, the cell gap, the height of the stepped difference that is created at the surrounding of a thin film transistor, or the like.

Hence, the applicants conceived that there is some correlation between the pixel pitch and the cell gap and there is an allowance value of the cell gap in correspondence with the pixel pitch. Also, they conceived that there is an allowable limit also in respect of the stepped difference which gives rise to the alignment defect in the rubbing operation.

As a result of conducting many researches by the applicants by actually fabricating liquid crystal display devices, they reached to acquire the following knowledge.

According to an aspect of the present invention, there is provided a liquid crystal display device comprising an active matrix substrate including gate lines and data lines arranged in a matrix form on the same substrate, a thin film transistor which is arranged at a pixel area surrounded by adjacent two of the gate lines and adjacent two of the data lines, and a pixel electrode connected to the thin film transistor, an opposed substrate comprising opposed electrodes on a surface thereof, a plurality of spacers and a liquid crystal material interposed between the active matrix substrate and the opposed substrate, wherein an interval between the active matrix substrate and the opposed substrate is one tenth of a pixel pitch of the pixel area or less.

For example, even if the value of the pixel pitch is changed, the allowable range of the cell gap is also changed in accordance therewith and therefore, the total scale remains unchanged. That is, when the drive voltage of the liquid crystal display device is controlled, an adverse influence is not caused in driving the liquid crystal layer.

Accordingly, the present invention is applicable without depending on the value of the pixel pitch. However, there is a limit in the adoptable value of the pixel pitch or the cell gap due to a limitation in the current technology. An explanation will be given with regard thereto by Embodiment 1.

The interval between the active matrix substrate and the opposed substrate is determined by spacers interposed therebetween. Therefore, the diameter (diameter in a vertical direction to the substrate) of the plurality of spacers scattered on the active matrix substrate must be one tenth of the pixel pitch or less.

Furthermore, there are stepped differences at the surroundings of the thin film transistors or wirings owing to the structure of the active matrix substrate and therefore, the above-described interval conditions must be satisfied by a longest distance of the cell gap (cell gap at flat portions of pixel areas).

Also, the inventors found that there is a correlation also between the pixel pitch and height of the stepped difference. According to researches by the inventors, the rubbing operation is carried out with no problem if the height of the stepped difference is 0.3 µm or less, whereby a liquid crystal display device with inconsiderable influence of the horizontal electric field and with no occurrence of the disclination, can be fabricated.

According to another aspect of the present invention, there is provided a method of fabricating a liquid crystal display device including the steps of forming an active matrix substrate including gate lines and data lines arranged in a matrix form on the same substrate, a thin film transistor which is arranged at a pixel area surrounded by adjacent two of the gate lines and adjacent two of the data lines and a pixel electrode each connected to the thin film transistor, forming an opposed substrate comprising an opposed electrode on a surface thereof, and providing a plurality of spacers and a liquid crystal material between the active matrix substrate and the opposed substrate wherein said interval between the active matrix substrate and the opposed substrate is one tenth of a pixel pitch of the pixel region.

According to another aspect of the present invention, there is provided a method of fabricating a liquid crystal display device comprising the steps of forming an active matrix substrate comprising gate lines and data lines arranged in a matrix form on the same substrate, a thin film transistor which is arranged at a pixel area surrounded by adjacent two of the gate lines and adjacent two of the data lines, a drain electrode connected to the thin film transistor, an interlayer insulating film covering the drain electrode, and pixel electrode connected to each of the drain electrodes via a contact hole formed in the interlayer insulating film, forming an opposed substrate comprising an opposed electrode on a surface thereof, and providing a liquid crystal material between the active matrix substrate and the opposed substrate wherein a film thicknesses of the drain electrodes is 0.3 µm or less.

DETAILED DESCRIPTION OF THE PREFERRED EMBODIMENTS

An explanation will be given of details of the present invention constituted as described above by embodiments described below.

Embodiment 1

With respect to Embodiment 1 an explanation will be given of details of steps of fabricating a liquid crystal display device based on the present invention. An explanation will be given of fabrication steps of a circuit TFT (Thin Film Transistor) and a pixel TFT arranged on an active matrix substrate in reference to FIGS. 2(A), 2(B), 2(C), 2(D) and 2(E) and an explanation will be given of fabrication steps (cell integration steps) of the liquid crystal display device in reference to FIGS. 3(A), 3(B), 3(C) and 3(D).

Incidentally, Embodiment 1 will be described by paying attention to mainly the correlation between the pixel pitch and the cell gap. Therefore, in Embodiment 1 the stepped difference stays at a nonproblematic level of 0.3 µm or less and an explanation thereof will not be given.

Figure 2A:
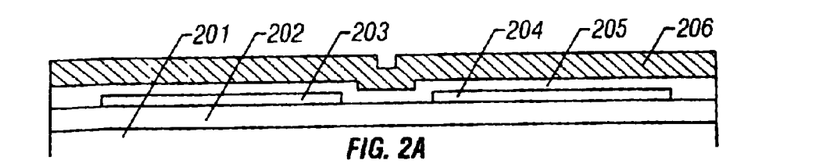
FIGS. 2(A), 2(B), 2(C), 2(D) and 2(E) are views showing fabrication steps of an active matrix substrate.

Firstly, a substrate having insulating performance, for example, a glass substrate 201 represented by Corning 7059 or Corning 1737 or the like is prepared. A silicon oxide film is formed on the glass substrate 201 by a thickness of 2000 Å as an underlayer film 202.

Next, an amorphous silicon film, not illustrated, is formed by a thickness of 500 Å. Plasma CVD (Chemical Vapor Deposition) process or low pressure thermal CVD process may be used as the film forming process.

When the amorphous silicon film, not illustrated, has been formed, crystallization is carried out in respect thereof by a suitable crystallizing process whereby a crystalline silicon film, not illustrated, is formed. For example, a heating treatment at around 600° C., annealing by using an excimer laser or the like is generally used.

Also, there may be adopted a means for forming the amorphous silicon film contain at least one metal element which help crystalize the amorphous silicon film in the crystallizing step. Details of the means are described in Japanese Unexamined Patent Publication No. 6-232059 and Japanese Unexamined Patent Publication No. 7-321339. According to the means, a silicon film having excellent crystallinity can be obtained through a heating treatment at comparatively low temperatures in a short period of time.

When the crystalline silicon film is provided by the heating treatment by the above-described means, annealing can be carried out effectively for the crystalline silicon film by using a laser or a strong light having an equivalent energy. Thereby, the crystallinity of the silicon film can significantly be improved.

Next, the provided crystalline silicon film is patterned whereby an island-like semiconductor layer 203 for constituting an active layer of a circuit TFT and an island-like semiconductor layer 204 for constituting an active layer of a pixel TFT are formed. (See FIG. 2(A))

After the active layers are formed, a silicon oxide film 205 having a thickness of 1200 Å is formed by a plasma CVD process whereby the active layers are covered. The silicon oxide film 205 functions later as a gate insulating film. Additionally, a silicon nitroxide film (for example, a compound designated by SiOXNY) or a silicon nitride film may be used in place thereof.

Next, an aluminum film 206 added with scandium by 0.2 weight % is formed by a thickness of 2500 Å through sputtering. The addition of scandium is effective in restraining occurrence of hillocks or whiskers on the surface of an aluminum film. The aluminum film 206 functions later as a gate electrode.

Incidentally, films of other metal materials, for example, Mo, Ti, Ta, Cr or the like may be used in place of the aluminum film and a film having an electric conductance such as polysilicon or a silicide group material may be used.

Next, anodic oxidation is carried out with the aluminum film 206 as an anode in an electrolysis solution. As the electrolysis solution, a solution where an ethylene glycol solution of 3% tartaric acid is neutralized by aqueous ammonia and the acidity is adjusted to pH=6.92, is used.

Also, the reaction is carried out with platinum as a cathode under conditions of a chemical treatment current of 5 mA and a voltage of 10 V.

A dense anodic oxide aluminum film, not illustrated, that is formed in this way is effective at later steps in promoting adherence thereof in respect of a photoresist. The film thickness can be controlled by controlling the voltage application time period (FIG. 2(A)).

When the state of FIG. 2(A) is provided in this way, the aluminum film 206 is patterned thereby forming a prototype of gate electrodes and data lines, not illustrated, which are to use in later steps. Further, a second anodic oxidation is carried out whereby porous anodic oxide aluminum films 207 and 208 are formed. The electrolysis solution is an aqueous solution of 3% of oxalic acid and the reaction is carried out with platinum as a cathode under conditions of the chemical treatment current of 2 through 3 mA and the voltage of 8 V (FIG. 2(B)).

Figure 2B:
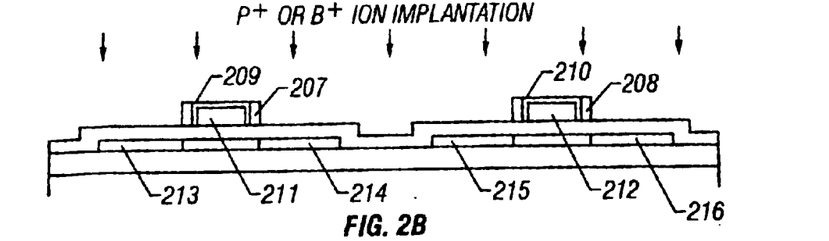

At this moment the second anodic oxidation is progressed in a direction in parallel to the substrate. The length of the porous anodic oxide films 207 and 208 can be controlled by controlling the voltage application time period.

Further, the photoresist is removed by an exclusively-used remover and thereafter, a third anodic oxidation is carried out. In this case the electrolysis solution where an ethylene glycol solution of 3% tartaric acid is neutralized by aqueous ammonia and the acidity is adjusted to pH=6.92, is used. The reaction is carried out with platinum as a cathode under conditions of the chemical treatment current of 5 through 6 mA and the voltage of 100 V.

Anodic oxide films 209 and 210 formed thereby are very dense and strong. Therefore, they are effective in protecting gate electrodes 211 and 212 against damage caused by later steps such as a doping step and the like.

The strong anodic oxide films 209 and 210 are difficult to etch and therefore, an etching time period in forming a contact hole may be prolonged. Therefore, a thickness thereof is preferably 1000 Å or less.

Next, an impurity is injected to the active layers 203 and 204 by an ion doping process under a state as illustrated by FIG. 2(B). For example, when an N channel type TFT is fabricated, phosphor may be used as the impurity and when a P channel type TFT is fabricated, boron may be used as the impurity.

Although only an example of making N channel type TFTs is described in Embodiment 1, an N channel type TFT and a P channel type TFT may be formed on the same substrate by using a publicly-known technology.

Source/drain regions 213 and 214 of the circuit TFT and source/drain regions 215 and 216 of the pixel TFT are self-adjustingly formed by the ion implantation.

Figure 2C:
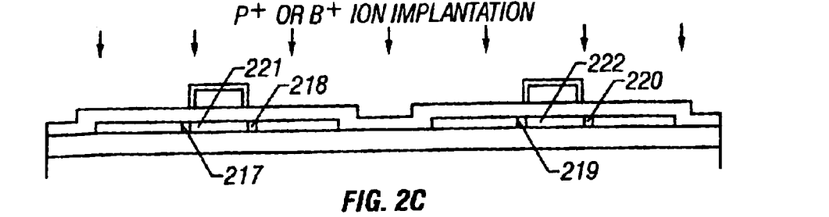

The porous anodic oxide aluminum films 207 and 208 are removed and the ion implantation is carried out again. The dose in this case is lower than that in the preceding ion implantation.

Low concentration impurity regions 217 and 218 and a channel forming region 221 of the circuit TFT and low concentration impurity regions 219 and 220 and a channel forming region 222 of the pixel TFT are self-adjustingly formed by the second ion implantation.

When the state illustrated by FIG. 2(C) is provided, irradiation of a laser light and a thermal annealing are successively carried out. According to Embodiment 1, the energy density of the laser light is 160 through 170 mJ/cm$^2$ and the thermal annealing is carried out at 300 through 450° C. for 1 hour.

By this step the crystallinity of the active layers 203 and 204 damaged by the ion doping steps is improved and the ion-implanted impurity ions are activated.

Figure 2D:
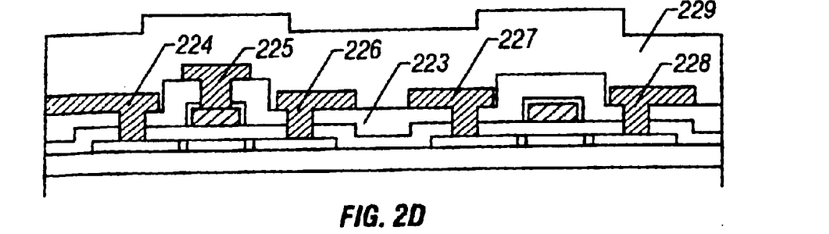

Next, a silicon nitride film (may be a silicon oxide film) is formed as a first interlayer insulating film 223 by a thickness of 3000 Å through a plasma CVD process. The interlayer insulating film 223 may be of a multilayered structure.

When the first interlayer insulating film 223 has been formed, contact holes are formed at regions where electrodes and wirings are to be formed. A source wiring (may be referred to as data line) 224, a gate wiring 225 and a drain wiring 226 of the circuit TFT and a source wiring 227 and a drain electrode 228 of the pixel TFT are formed by laminated layers made of aluminum as a major component and titanium.

In this case the gate electrode 212 of the pixel TFT is integrated with a gate line, not illustrated, drawn to the outside of the pixel area and therefore, a contact hole needs not to be formed. Also, the drain electrode 228 serves later as a lead line for connecting the pixel electrode and the active layer.

Figure 2E:
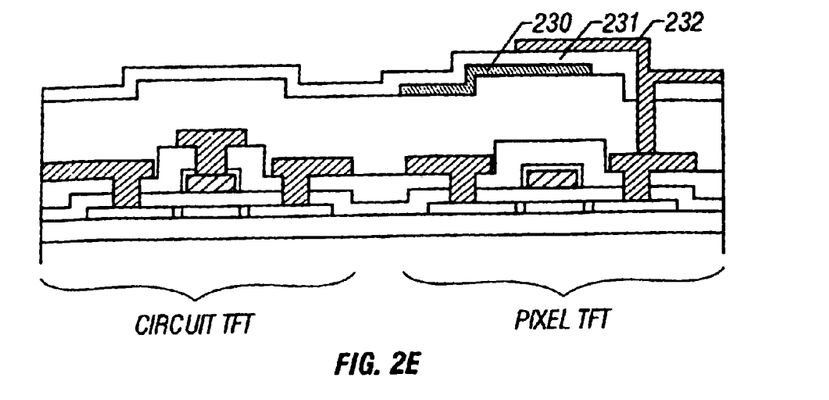

Next a second interlayer insulating film 229 is formed by a thickness of 0.5 to 5 μm through a plasma CVD process. A single layer or a laminated layer comprising silicon oxide films, silicon nitride films, organic resin and the like may be used as the interlayer insulating film 229.

When an organic resin material such as polyimide or the like is used for the second interlayer insulating film 229, a larger film thickness may easily be provided and therefore, the second interlayer insulating film 229 may be provided with a function as a flattering film. That is, the stepped difference on the active matrix substrate can be made as small as possible.

When the second interlayer insulating film 229 is formed, a black matrix 230 is formed. A metal thin film such as a chromium film, a titanium film or the like or a resin material dispersed with a black pigment may be used for the black matrix 230.

When the black matrix 230 is formed on the side of the active matrix substrate, the formation is effective since the aperture ratio is not deteriorated because the masked region can be covered by a necessary minimum area of occupancy.

After formation of a third interlayer insulating film 231, a contact hole is formed by etching a portion of the second interlayer insulating film 229 over the drain electrode 228 of the pixel TFT and a pixel electrode 232 for connecting electrically to the drain electrode 228, is formed.

The active matrix substrate having the circuit TFT and the pixel TFT as illustrated by FIG. 2(E) is formed in this way. Actually, several hundred thousands of the circuit TFTs are arranged in the drive circuit region to thereby constitute CMOS (Complementary Metal Oxide Semiconductor) circuits and the like and several tens through several millions of the pixel TFTs are arranged in the pixel areas.

Incidentally, the pixel areas are designed to form at 50 μm interval of the pixel pitch in the image display region of the active matrix substrate fabricated in Embodiment 1. The pixel pitch generally differs by the use of the liquid crystal display device. For example, a liquid crystal panel used in an note personal computer is constituted by the pixel pitch of about 110 μm. Additionally, if the pixel pitch is larger than necessary, the display image is coarsened.

Next, an explanation will be given of details of cell integration steps in reference to FIGS. 3(A), 3(B), 3(C) and 3(D). In integrating cells, the opposed transparent substrate comprising a opposite electrode and an alignment film is prepared other than the active matrix substrate formed by the above-described steps.

Incidentally, if it needs to e display an image in color, a color filter may be provided on the side of the opposed substrate although not particularly shown. It is required for the color filter to be flat, to have a uniform thickness, and to be excellent in thermal resistance and chemical proof and the like.

After the active matrix substrate and the opposed substrate are formed, respectively, the rubbing operation is successively carried out to the both substrates whereby a desired alignment is provided in the alignment layers of the substrates. The alignment of the liquid material at the proximities of the substrates is determined by this step. (FIG. 3(A))

Figure 3A:
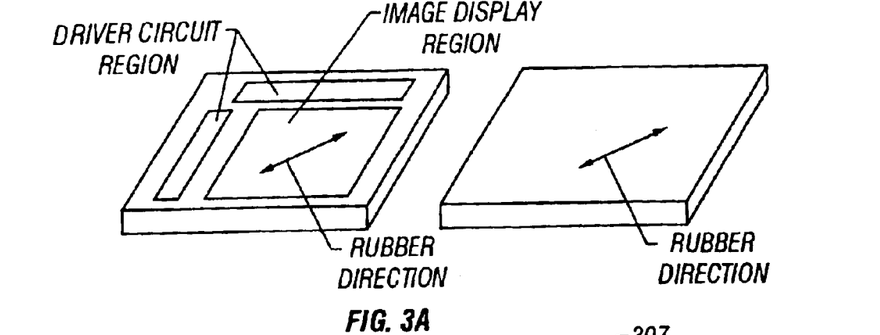
FIGS. 3(A), 3(B), 3(C) and 3(D) are views showing cell integration steps.
Figure 3B:
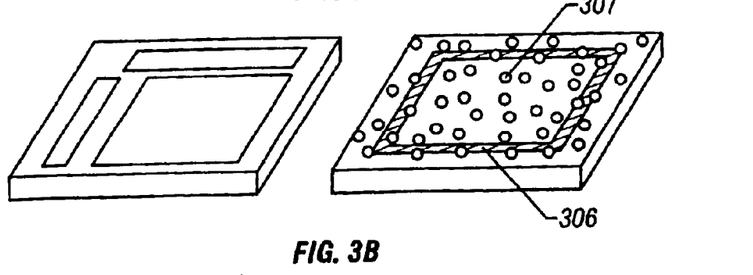

After the rubbing operation is finished, a seal member 306 is formed on the opposed substrate as to surround the drive circuit region and the pixel region, respectively, by a screen printing. An epoxy group resin and a phenol curing agent are dissolved in a solvent of "Ethylcellsolve" may be used for the seal member 306. Further, an opening portion (liquid crystal injecting part) for injecting the liquid crystal material later is formed at a portion of the seal member 306.

The seal member 306 is effective not only in adhering together the substrates but preventing the injected liquid crystal material from leaking from the vicinity of the image display region.

Successively, spacers 307 are scattered over the opposed substrate. Spherical fine particles made of a polymer group, a glass group or a silica group material are used as the spacers 307 and they are scattered all over the opposed substrate by injecting them from a nozzle. (FIG. 3(B))

The diameter of the spacers 307 must be one tenth of the pixel pitch or less. That is, it is important that the cell gap between the substrates is one tenth of the pixel pitch or less. The pixel pitch in Embodiment 1 is 50 μm and therefore, the diameter of the spacers 307 is determined as 4 μm in consideration of a little margin.

When the cell gap is extremely too narrow, the surface waviness of the glass substrate or an error of the spacer diameter becomes influential. Therefore, currently the lowest limit of the cell gap is about 1 μm. Therefore, the present invention seems to have an applicable limit of a liquid crystal display device having a pixel pitch of about 10 μm.

In order to prevent the contamination and electrostatic destruction of TFTs, the steps of printing the seal member and scattering the spacers are carried out on the side of the opposed substrate. The step of scattering the spacer is particularly preferably carried out on the side of the opposed substrate since the step is accompanied by generation of static electricity.

Next, the active matrix substrate and the opposed substrate are pasted together. In the pasting operation the spacers 307 are interposed between the both substrates and the cell gap is determined by the diameter of the spacers 307. (FIG. 3(C))

Figure 3C:
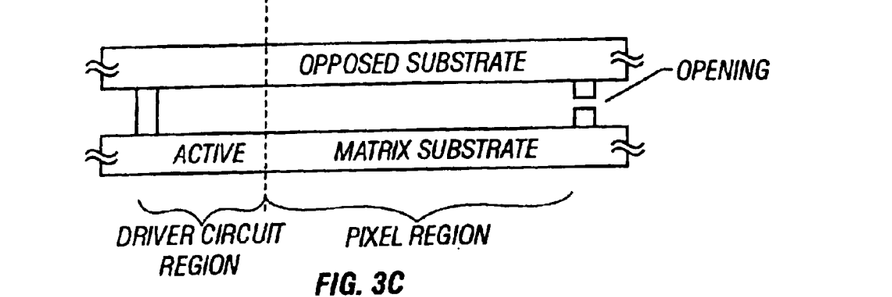

As has been described, the diameter of the spacers 307 is 4 μm and therefore, the cell gap between the substrates becomes 4 μm. Technologies for uniform scattering of the spacers 307 and accurate pasting of the substrates are required in the present invention since it is important to provide the accurate cell gap.

Figure 3D:
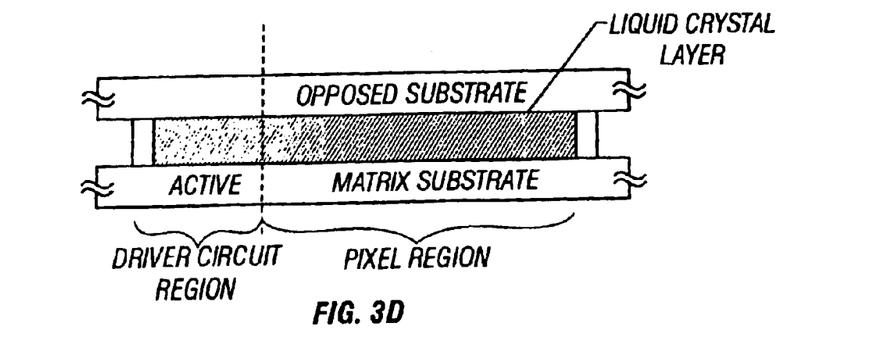

After the pasting of the active matrix substrate and the opposed substrate has been finished, the liquid crystal material is injected from the opening portion that is previously formed in the seal member 306 whereby the liquid crystal is held in the pixel areas. Finally, the opening portion is sealed whereby a liquid crystal display device as illustrated by FIG. 3(D) is completed.

The liquid crystal display device which has been formed after the above-described steps, is provided with high image quality with no occurrence of image failure such as disclination since the cell gap is rendered one tenth or less (4 μm in Embodiment 1) of the pixel pitch (50 μm in Embodiment 1) based on the present invention.

An explanation has been given of the case where the pixel pitch is 50 μm in Embodiment 1. However, as described above, actually, the pixel pitch differs by the size or the use of the liquid crystal panel. For example, according to a current direct viewing type liquid crystal display device, a liquid crystal panel having a pixel pitch of about several hundreds μm, is manufactured.

However, when the cell gap is extremely increased even with the pixel pitch of several hundreds μm, the electric field formed between the pixel electrode and the opposed electrode is weakened. The voltage level of the image signal and accordingly, the intensity of the electric field formed in the liquid crystal layer is substantially limited in consideration of the drive voltage and the like of the liquid crystal panel and therefore, the cell gap is preferably 10 μm or less.

Further, although the cell gap of about 5 through 6 μm seems to be secured in a liquid crystal panel that is generally fabricated or trially fabricated irrespective of the pixel pitch, it is anticipated that a tendency where a highly fine structure of the liquid crystal panel is required and the pixel pitch is further made fine, will be intensified.

For example, a projection type liquid crystal display device needs to have a constitution capable of displaying an image as fine as possible since the panel size is small and projecting an image on a screen. Therefore, hereinafter, there will be a compelling necessity of fabricating a liquid crystal display device having the pixel pitch of 40 μm or less or even 30 μm or less.

At that time, it is conceivable that the disclination probably occurs by receiving the influence of the horizontal electric field if the cell gap remains as 5 through 6 μm. Therefore, the cell gap will be decreased in correspondence with the narrowing the pixel pitch.

Based on the above-described explanation, the effectiveness of the present invention is achieved in the case where the pixel pitch is made fine to 40 μm or less.

Embodiment 2

An explanation will be given of Embodiment 2 by paying attention to a stepped difference in accordance with the present invention. In Embodiment 2, an example of an active matrix type liquid crystal display device using a thin film transistor having the constitution where a pixel electrode is connected to a drain electrode that is connected to an active layer.

As mentioned above, the stepped differences are formed at the surroundings of the thin film transistor and the respective wirings, and may cause alignment defect of a liquid crystal material by causing rubbing failure or creating a horizontal electric field generated at side faces of the stepped differences.

Normally, even if a disclination caused by the stepped difference of a wiring intersecting portion or on a thin film transistor occurs, the disclination poses no problem since it can be hidden by a black matrix. Also, in the case where the black matrix is installed on the side of the opposed substrate the problem is resolved by hiding a region where the stepped difference is caused.

However, when the black matrix is installed on the side of the active matrix substrate as in Embodiment 1, the masking is difficult at the contact portion for electrically connecting the pixel electrode and the thin film transistor and therefore, the disclination poses a problem.

Hence, an explanation will be given of the height of the stepped difference caused in the vicinity of the contact portion in Embodiment 2. Incidentally, the explanation will be given in reference to FIGS. 4(A) and 4(B) where the notations used in FIGS. 2(A), 2(B), 2(C), 2(D) and 2(E) are referred to as they are.

Figure 4A:
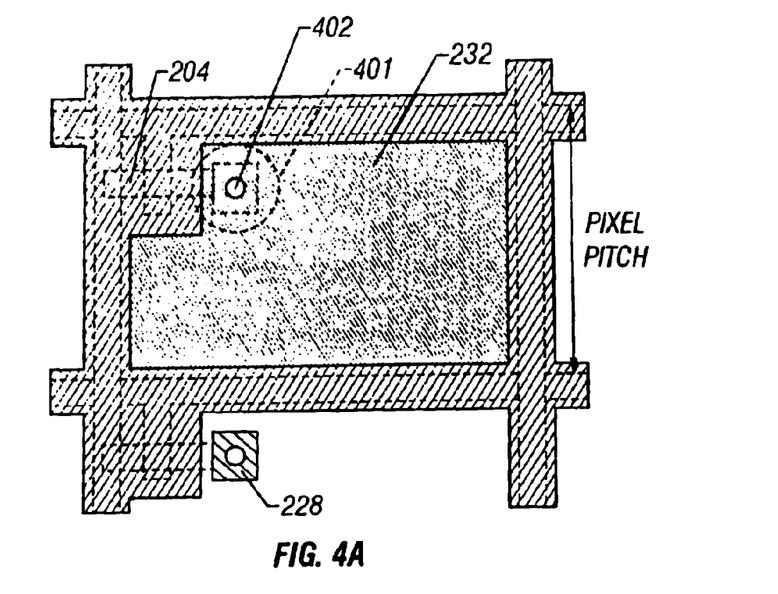
FIGS. 4(A) and 4(B) are views showing the constitution of a liquid crystal display device.

FIG. 4(A) is a top view of a pixel area and a region encircled by a dotted line designated by numeral 401 indicates a contact portion for connecting the pixel electrode 232 and the active layer 204 (exactly speaking, the drain region 216) of the pixel TFT. Further, numeral 402 designates a contact hole.

Figure 4B:
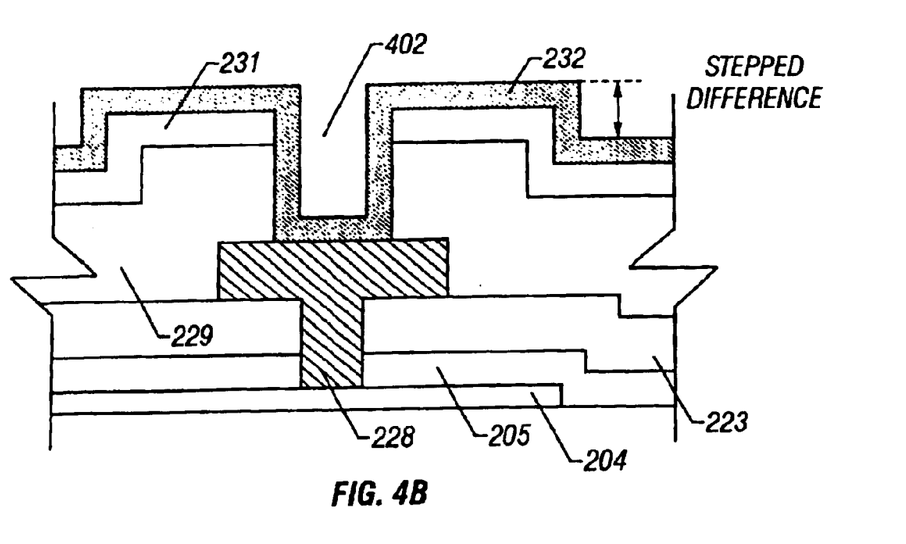

FIG. 4(B) is an enlarged sectional view showing a contact portion 401 in Embodiment 2. Numeral 204 designates the active layer, numeral 205 designates the gate insulating film, numeral 223 designates the first interlayer insulating film and numeral 229 designates the second interlayer insulating film.

Embodiment 2 is characterized in that the active layer 204 and the pixel electrode 232 are electrically connected via the drain electrode 228.

According to the experience of the inventors, it has been revealed that the contact resistance that is created between the pixel electrode (for example, an ITO (Indium Tin Oxide) film is used) 232 and the active layer (generally, a silicon film is used) 204, is nonlinear and therefore, an Ohmic contact is difficult to produce.

Accordingly, it is effective to constitute a structure where the Ohmic contact is produced by a conductive film, for example, a laminated layer of titanium films and aluminum films whereby the Ohmic contact is easy to provide. Incidentally, it has been revealed by a research by the inventors that when the aluminum film and the ITO film are brought into contact with each other, the aluminum film is dissolved and therefore, according to Embodiment 2, the conductive film is provided with the structure where an aluminum film is interposed between titanium films.

Under such a construction, even if rubbing failure is caused inside of the contact hole 402, the drain electrode 228 achieves an effect similar to that of the black matrix. Therefore, even if a disclination occurs, it is not visually recognized.

According to the present invention, it is necessary that the height of the stepped difference (corresponding to the film thickness of the drain electrode 228 in FIG. 4(B)) as illustrated by FIG. 4(B) is restricted to 0.3 μm or less when the contact portion having a structure as illustrated by FIG. 4(B) is formed.

Therefore, when the drain electrode 228 is formed, the height of the stepped difference can be restrained to 0.3 μm or less by making the film thickness 0.3 μm or less, preferably, 0.25 μm or less.

According to Embodiment 2, the drain electrode 228 is formed by a laminated film made of a material whose major component is aluminum and titanium films and a film thickness is made 0.25 μm. Incidentally, if the drain electrode 228 is formed to taper down, the stepped difference per se is provided with a tapered shape whereby the rubbing failure is difficult to occur.

As described above, the height of the stepped difference caused in the vicinity of the contact portion is 0.3 μm or less according to the constitution of Embodiment 2. Therefore, the occurrence of disclination caused by rubbing failure or the horizontal electric field can be prevented at the surrounding of the contact portion.

According to the present invention, the cell gap is prescribed in accordance with the pixel pitch in forming a liquid crystal display device. Specifically, the cell gap is prescribed to one tenth of the pixel pitch or less.

Also, at the contact portion between the thin film transistor and the pixel electrode, the stepped difference caused by the structural reason is rendered 0.3 μm or less.

A highly fine liquid crystal display device with no occurrence of image failure such as disclination can be realized in accordance with the constitution of the present invention as described above.

For example, in fabricating a liquid crystal display device under the specification of EWS (Engineering Work Station) having a diagonal size of 2 inches, when a ratio of the image display region is made 5:4 (1280×1024 pixels), the pixel pitch becomes about 30 μm. In that case, according to the present invention, the cell gap is made 3 μm or less and the height of the stepped difference is made 0.3 μm or less whereby the disclination can be restrained from occurring.

Furthermore, the present invention is applied not only to the transmission type liquid crystal display device as the above-mentioned examples but also to a reflection type liquid crystal display device.

What is claimed is:

1. An electric device comprising:
   a plurality of gate lines and a plurality of data lines arranged in a matrix form over a substrate;
   a plurality of thin film transistors over said substrate, each thin film transistor arranged at a pixel area surrounded by adjacent two of said gate lines and adjacent two of said data lines;
   an interlayer insulating film comprising silicon over said thin film transistors;
   a flattering film over said interlayer insulating film; a plurality of pixel electrodes over said flattering film, each connecting to a drain electrode of the corresponding thin film transistor;
   an opposed substrate comprising an opposed electrode on a surface thereof; and at least one spacer interposed between said substrate and said opposed substrate,
   wherein a pixel pitch of said pixel area is 40 μm or less, and
   wherein a thickness of said spacer in a direction vertical to said substrate and said opposed substrate is 4 μm or less.

2. A device according to claim 1, wherein said pixel pitch is a length of a short side of the pixel area.

3. A device according to claim 1, wherein said substrate has at least one black matrix disposed over said flattering film.

4. A device according to claim 1, wherein said pixel pitch is 30 μm or less.

5. A device according to claim 1, wherein said interlayer insulating film comprises silicon oxide or silicon nitride.

6. A device according to claim 1, wherein said flattering film comprises a material selected from the group consisting of silicon oxide, silicon nitride, and organic resin.

7. A device according to claim 1, wherein said each thin film transistor has at least one gate electrode comprising a material selected from the group consisting of Al, Mo, Ti, Ta, Cr, polysilicon, and silicide.

8. A device according to claim 1, wherein said spacer is a spherical shape.

9. A device according to claim 1, wherein said spacer comprises a material selected from the group consisting of polymer group, glass group and silica group materials.

10. A device according to claim 1, further comprising a liquid crystal material interposed between said substrate and said opposed substrate, wherein said liquid crystal material is selected from the group consisting of twisted nematic type and super twisted nematic type liquid crystal materials.

11. A device according to claim 1, wherein said electric device is a projection type display device having at least one liquid crystal panel.

12. A method of fabricating an electric device comprising the steps of:
   forming a plurality of gate lines and a plurality of data lines arranged in a matrix form over a substrate;
   forming a plurality of thin film transistors over said substrate, each thin film transistor arranged at a pixel area surrounded by adjacent two of said gate lines and adjacent two of said data lines;
   forming a first interlayer film comprising an insulating material containing silicon over said thin film transistors;
   forming a second interlayer film over said first interlayer film;
   forming a plurality of pixel electrodes over said flattering film, each connecting to a drain electrode of the corresponding thin film transistor;
   and forming an opposed substrate comprising an opposed electrode on a surface thereof,
   wherein a pixel pitch of said pixel area is 40 μm or less,
   wherein an interval between said substrate and said opposed substrate is 4 μm or less, and
   wherein a stepped difference of said pixel electrode formed over a circumference of said drain electrode is 0.3 μm or less.

13. A method according to claim 12, further comprising a step of forming at least one black matrix over said second interlayer film.

14. A method according to claim 12, further comprising a step of providing a liquid crystal material between said substrate and said opposed substrate.

15. A method according to claim 14, wherein said liquid crystal material is selected from the group consisting of twisted nematic type and super twisted nematic type liquid crystal materials.

16. A method according to claim 12, wherein said pixel pitch is a length of a short side of the pixel area.

17. A method according to claim 12, wherein said pixel pitch is 30 µm or less.

18. A method according to claim 12, wherein said first interlayer film comprises silicon oxide or silicon nitride.

19. A method according to claim 12, wherein said second interlayer film comprises a material selected from the group consisting of silicon oxide, silicon nitride, and organic resin.

20. A method according to claim 12, wherein said each thin film transistor has at least one gate electrode comprising a material selected from the group consisting of Al, Mo, Ti, Ta, Cr, polysilicon, and silicide.

21. A method according to claim 12, wherein said electric device is a projection type display device having at least one liquid crystal panel.

22. An electric device comprising:
a plurality of gate lines and a plurality of data lines arranged in a matrix form over a substrate;
a plurality of thin film transistors over said substrate, each of said thin film transistor arranged at a pixel area surrounded by adjacent two of said gate lines and adjacent two of said data lines;
an interlayer insulating film comprising silicon over said thin film transistors;
a flattering film over said interlayer insulating film;
a plurality of pixel electrodes over said flattering film, each pixel electrode formed over the corresponding thin film transistor and connected to a drain electrode of said thin film transistor; and
an opposed substrate comprising at least an opposed electrode on a surface thereof,
wherein an interval between said substrate and said opposed substrate is 4 µm or less, and
wherein a stepped difference of said pixel electrode formed over a circumference of said drain electrode is 0.3 µm or less.

23. A device according to claim 22, wherein said substrate has at least one black matrix disposed over said flattering film.

24. A device according to claim 22, wherein a pixel pitch of the pixel area is a length of a short side of the pixel area.

25. A device according to claim 22, wherein a pixel pitch of said pixel area ranges between 10 and 40 µm.

26. A device according to claim 22, further comprising a plurality of spacers in said interval between said substrate and said opposed substrate.

27. A device according to claim 22, further comprising a liquid crystal material interposed between said substrate and said opposed substrate.

28. A device according to claim 22, wherein said liquid crystal material is selected from the group consisting of twisted nematic type and super twisted nematic type liquid crystal materials.

29. A device according to claim 27, wherein said interlayer insulating film comprises silicon oxide or silicon nitride.

30. A device according to claim 22, wherein said flattering film comprises a material selected from the group consisting of silicon oxide, silicon nitride, and organic resin.

31. A device according to claim 22, wherein said each thin film transistor has at least one gate electrode comprising a material selected from the group consisting of Al, Mo, Ti, Ta, Cr, polysilicon, and silicide.

32. A device according to claim 22, wherein said electric device is a projection type display device having at least one liquid crystal panel.

33. An electric device comprising:
a plurality of gate lines and a plurality of data lines arranged in a matrix form over a substrate;
a plurality of thin film transistors formed over said substrate, each of said thin film transistors arranged at a pixel area surrounded by adjacent two of said gate lines and adjacent two of said data lines;
an interlayer insulating film comprising silicon formed over said thin film transistors; a flattering film formed over said interlayer insulating film;
a plurality of black matrices, each black matrix formed over a corresponding thin film transistor; a plurality of pixel electrodes, each pixel electrode formed over said flattering film and connected to a drain electrode of said thin film transistor;
and an opposed substrate comprising at least an opposed electrode on a surface thereof,
wherein a pixel pitch of said pixel area is 40 µm or less,
wherein an interval between said substrate and said opposed substrate is 4 µm or less, and
wherein a stepped difference of said pixel electrode formed over a circumference of said drain electrode is 0.3 µ or less.

34. A device according to claim 33, wherein said interval between said substrate and said opposed substrate is one tenth of said pixel pitch of said pixel area or less.

35. A device according to claim 33, wherein said pixel pitch ranges between 10 and 40 µm.

36. A device according to claim 33, further comprising a plurality of spacers in said interval between said substrate and said opposed substrate.

37. A device according to claim 33, further comprising a liquid crystal material interposed between said active matrix substrate and said opposed substrate.

38. A device according to claim 33, wherein said liquid crystal material is selected from the group consisting of twisted nematic type and super twisted nematic type liquid crystal materials.

39. A device according to claim 37, wherein said pixel pitch is a length of a short side of the pixel area.

40. A device according to claim 33, wherein said interlayer insulating film comprises silicon oxide or silicon nitride.

41. A device according to claim 33, wherein said flattering film comprises a material selected from the group consisting of silicon oxide, silicon nitride, and organic resin.

42. A device according to claim 33, wherein said each thin film transistor has at least one gate electrode comprising a material selected from the group consisting of Al, Mo, Ti, Ta, Cr, polysilicon, and silicide.

43. A device according to claim 33, wherein said electric device is a projection type display device having at least one liquid crystal panel.

44. An electric device comprising:
a plurality of gate lines and a plurality of data lines arranged in a matrix form over a substrate;
a plurality of thin film transistors formed over said substrate, each of said thin film transistors arranged at a pixel area surrounded by adjacent two of said gate lines and adjacent two of said data lines;
an interlayer insulating film comprising silicon formed over said thin film transistors;
a flattering film formed over said interlayer insulating film;

a plurality of black matrices, each black matrix formed over a corresponding thin film transistor; a plurality of pixel electrodes, each pixel electrode formed over said flattering film and connected to a drain electrode of said thin film transistor;

and an opposed substrate comprising at least an opposed electrode on a surface thereof, wherein an interval between said substrate and said opposed substrate is 4 μm or less, and wherein a stepped difference of said pixel electrode formed over a circumference of said drain electrode is 0.3 μm or less.

45. A device according to claim 44, wherein said interval between said substrate and said opposed substrate is one tenth of a pixel pitch of said pixel area or less.

46. A device according to claim 45, wherein said pixel pitch ranges between 10 and 40 μm.

47. A device according to claim 44 further comprising a plurality of spacers in said interval between said substrate and said opposed substrate.

48. A device according to claim 44 further comprising a liquid crystal material interposed between said substrate and said opposed substrate.

49. A device according to claim 48, wherein said liquid crystal material is selected from the group consisting of twisted nematic type and super twisted nematic type liquid crystal materials.

50. A device according to claim 44, wherein a pixel pitch of the pixel area is a length of a short side of the pixel area.

51. A device according to claim 44, wherein said interlayer insulating film comprises silicon oxide or silicon nitride.

52. A device according to claim 44, wherein said flattering film comprises a material selected from the group consisting of silicon oxide, silicon nitride, and organic resin.

53. A device according to claim 44, wherein said each thin film transistor has at least one gate electrode comprising a material selected from the group consisting of Al, Mo, Ti, Ta, Cr, polysilicon, and suicide.

54. A device according to claim 44, wherein said electric device is a projection type display device having at least one liquid crystal panel.

55. An electric device comprising:
a plurality of gate lines and a plurality of data lines arranged in a matrix form over a substrate;

a plurality of switching elements over said substrate, each switching element arranged at a pixel area surrounded by adjacent two of said gate lines and adjacent two of said data lines;

an interlayer insulating film comprising silicon over said switching elements;

a flattering film over said interlayer insulating film; a plurality of pixel electrodes over said flattering film, each pixel electrode connecting to a drain electrode of the corresponding switching element; and an opposed substrate comprising at least an opposed electrode on a surface thereof, wherein a pixel pitch of said pixel area is 40 μm or less, and wherein an interval between said substrate and said opposed substrate is 4 μm or less, and wherein a stepped difference of said pixel electrode formed over a circumference of said drain electrode is 0.3 μ or less.

56. A device according to claim 55, wherein said switching elements are thin film transistors.

57. A device according to claim 55, wherein said substrate has at least one black matrix over said flattering film.

58. A device according to claim 55, wherein said pixel pitch is 30 μm or less.

59. A device according to claim 55, wherein said interlayer insulating film comprises silicon oxide or silicon nitride.

60. A device according to claim 55, wherein said flattering film comprises a material selected from the group consisting of silicon oxide, silicon nitride, and organic resin.

61. A device according to claim 55, further comprising a liquid crystal material interposed between said substrate and said opposed substrate.

62. A device according to claim 61, wherein said liquid crystal material is selected from the group consisting of twisted nematic type and super twisted nematic type liquid crystal materials.

63. A device according to claim 55, wherein said electric device is a projection type display device having at least one liquid crystal panel.

64. A device according to claim 54, wherein said each switching element has at least one gate electrode comprising a material selected from the group consisting of Al, Mo, Ti, Ta, Cr, polysilicon, and silicide.

65. An electric device comprising:
a plurality of gate lines and a plurality of data lines arranged in a matrix form over a substrate;

a plurality of switching elements over said substrate, each of said switching element arranged at a pixel area surrounded by adjacent two of said gate lines and adjacent two of said data lines; an interlayer insulating film comprising silicon over said switching elements;

a flattering film over said interlayer insulating film;

a plurality of pixel electrodes over said flattering film, each pixel electrode formed over the corresponding switching element and connected to a drain electrode of said switching element; and an opposed substrate comprising at least an opposed electrode on a surface thereof, wherein an interval between said substrate and said opposed substrate is 4 μm or less, and wherein a stepped difference of said pixel electrode formed over a circumference of said drain electrode is 0.3 μm or less.

66. A device according to claim 65, wherein said switching elements are thin film transistors.

67. A device according to claim 65, wherein said substrate has at least one black matrix disposed over said flattering film.

68. A device according to claim 65, wherein a pixel pitch of said pixel area ranges between 10 and 40 μm.

69. A device according to claim 65, further comprising a plurality of spacers in said interval between said substrate and said opposed substrate.

70. A device according to claim 65, further comprising a liquid crystal material interposed between said substrate and said opposed substrate.

71. A device according to claim 70, wherein said liquid crystal material is selected from the group consisting of twisted nematic type and super twisted nematic type liquid crystal materials.

72. A device according to claim 65, wherein a pixel pitch of the pixel area is a length of a short side of the pixel area.

73. A device according to claim 65, wherein said flattering film comprises a material selected from the group consisting of silicon oxide, silicon nitride, and organic resin.

74. A device according to claim 65, wherein said electric device is a projection type display device having at least one liquid crystal panel.

* * * * *